UNITED STATES PATENT OFFICE.

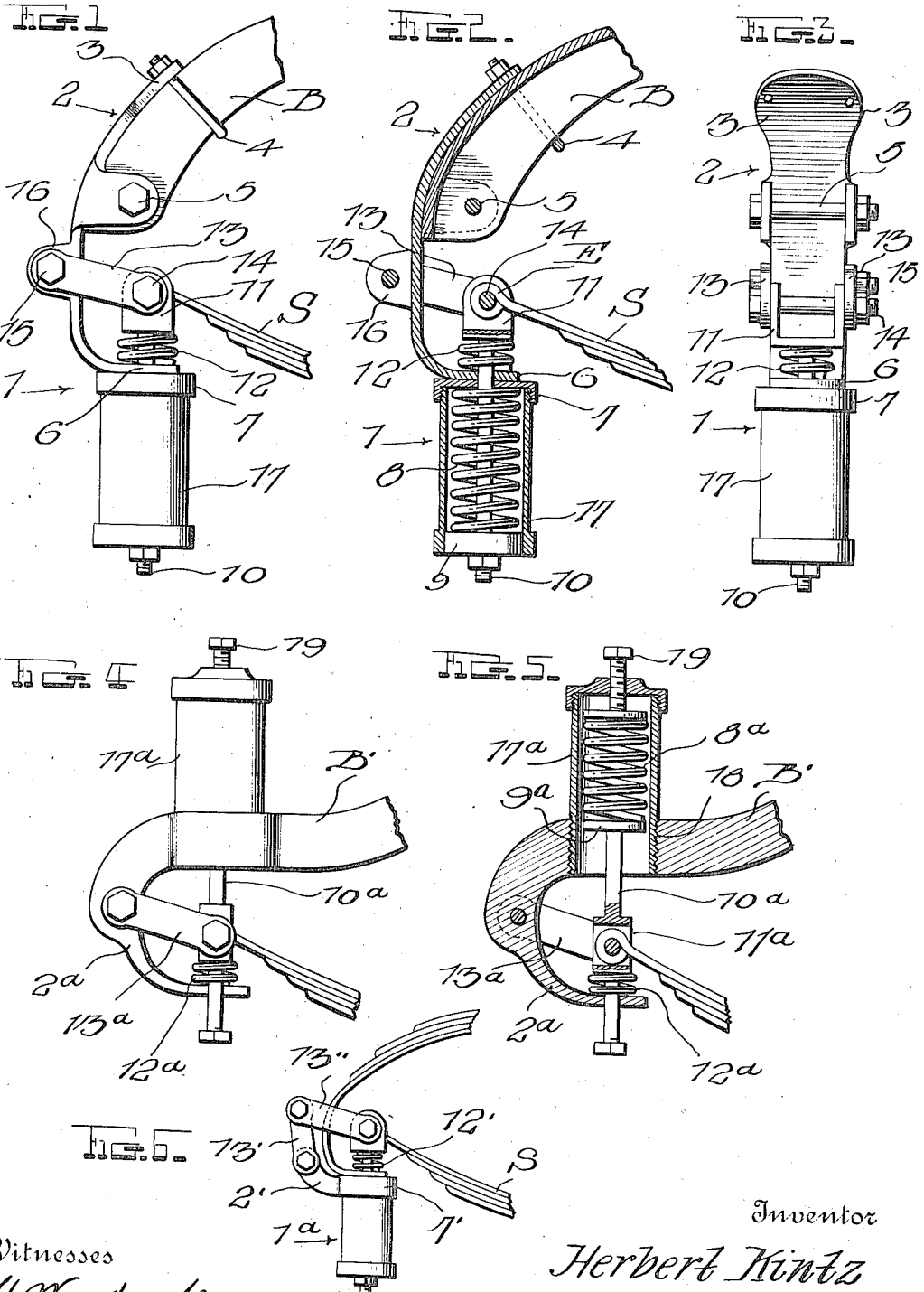

HERBERT KINTZ, OF SHARPSBURG, PENNSYLVANIA.

SHOCK-ABSORBER.

1,177,114. Specification of Letters Patent. Patented Mar. 28, 1916.

Application filed May 5, 1915. Serial No. 26,180.

*To all whom it may concern:*

Be it known that I, HERBERT KINTZ, a citizen of the United States, residing at Sharpsburg, in the county of Allegheny and State of Pennsylvania, have invented certain new and useful Improvements in Shock-Absorbers; and I do declare the following to be a full, clear, and exact description of the invention, such as will enable others skilled in the art to which it appertains to make and use the same.

My invention relates broadly to improvements in vehicle accessories and more particularly to shock absorbers designed primarily for attachment to automobiles having either full, quarter, or half elliptical springs.

The object of the invention is to provide a device of the class set forth which, although being extremely simple in construction and comparatively inexpensive, will be highly efficient in operation and will possess a number of advantageous features.

With this general object in view, the invention resides in certain novel features of construction and unique combinations of parts to be hereinafter fully described and claimed.

In describing the invention, I shall refer to the accompanying drawing wherein like reference characters designate corresponding parts throughout the several views and wherein:

Figure 1 is a side elevation of a portion of an automobile chassis and the front end of a half elliptical spring beneath the same, showing the application of one form of the improved shock absorber to use; Fig. 2 is a central longitudinal section through the front ends of the parts shown in Fig. 1; Fig. 3 is an edge view of the shock absorber detached; Fig. 4 is a view similar to Fig. 1 but showing a modified form of the shock absorber applied to use; Fig. 5 is a vertical section through the front ends of the parts shown in Fig. 4; Fig. 6 is a side elevation of one end of a full elliptical spring showing the application of a third form of the invention to use.

In this drawing which constitutes a part of the application, in Figs. 1 to 3 inclusive B designates the downturned front end of one of the side bars of an automobile chassis, while S indicates a half elliptical spring disposed beneath the bar B and having an eye E at its front end which usually receives a bolt passed through the front end of the bar B. When applying the invention to use, however, this bolt is removed and a shock absorber 1 is interposed between the bar B and the spring S as most clearly disclosed in Figs. 1 and 2.

The shock absorber 1 just mentioned, comprises an attaching bracket 2 which is in the form of a curved steel bar having at one end a pair of laterally extending ears 3 receiving therein the bolts of a clamp 4 which is passed beneath the front portion of the bar B, while directly beneath the ears 3 an additional pair of ears is provided, the latter being formed integrally with the opposite sides of the bar 2 and being extended laterally therefrom to straddle the downturned front end of the bar B, the bolt 5 being then passed through said end and through said additional ears.

By the detail of construction just described, it will be evident that the bracket 2 may be attached to practically any type of automobile having a half elliptic spring.

The lower end of the bar 2 is bent rearwardly and apertured to provide a horizontally disposed foot 6 which rests on a downwardly movable cap 7, the latter being in turn supported by a coiled spring 8 of any preferred type, while the spring 8 bears at its lower end upon a washer or the like 9 carried by an upright rod 10 which rises through a central opening in the cap 7, through an aperture in the foot 6, and is provided at its upper end with a fork 11 receiving therein the eye E, a recoil spring 12 being interposed between the aforesaid foot and the fork 11 as clearly shown. Disposed in contact with the opposite sides of the fork 11 and extending forwardly therefrom, is a pair of downwardly and rearwardly inclined links 13, the rear ends of these links being apertured for the reception of a bolt 14 which passes therethrough, through the fork 11, and through the eye E disposed therein, while the front ends of the links 13 are pivotally supported by a bolt 15 which passes therethrough and through an additional pair of ears 16 which is formed on the front side of the bar 2 below the ears previously described.

When the invention is applied to use, as disclosed in Figs. 1 and 2 it will be evident that the weight of the vehicle is supported by the spring 8, which spring will be compressed as the vehicle is propelled, during which movement the fork 11 will be guided in an upward and rearward direction by the inclined links 13, thus causing the spring S to move in this direction and allowing the front wheels and axle of the automobile to likewise yield rearwardly to a slight extent, thus effectively absorbing shocks which would otherwise excessively jar the entire automobile. Needless to say, it is highly essential to provide the vertically swinging links 13 interposed between the spring S and the chassis, combined with spring means for controlling the movement of said links, this being the most salient feature of the invention although it is highly expedient to construct the brackets 2 in the manner previously described and to provide the recoil springs 12 for preventing the spring S from coming into contact with the foot 6 or cap 7, when the movable parts return to normal position.

In connection with the parts above described, a cylindrical casing 17 is preferably secured by screw threads or otherwise to the cap 7, said casing surrounding the spring 8 and the washer 9 to prevent the entrance of dust and dirt, but it will be evident that proper operation of these parts is not hindered by the casing, since they are free to shift therein.

In Figs. 4 and 5 a casing $17^a$ is shown as secured by screw threads 18 to one side of one of the bars B', said casing being extended above the bar and being provided at its upper end with a cap through which a set screw 19 carrying a bearing plate on its inner end is threaded, a coiled spring $8^a$ being disposed directly below and in contact with said bearing plate, while bearing against the lower end of the spring $8^a$ is a washer or plunger $9^a$, this plunger being carried by the upper end of a rod $10^a$ which carries a fork $11^a$ intermediate its ends receiving an eye on the end of the semi-elliptic spring, while a portion of the rod below the fork is extended through a guide eye in the downwardly and rearwardly extending bracket member $2^a$ which is shown in the present application as formed integrally with the front end of the bar B', a pair of links $13^a$ being pivoted at their rear ends to the bolt passing through the spring eye and through the fork $11^a$, while their front ends are pivoted to the intermediate portion of the bracket member $2^a$.

It will be evident to those skilled in the art to which this invention relates, that by proper adjustment of the set screw 19 the tension of the spring $8^a$ may be varied, whereas by such adjustment of the plunger 9 previously described, the tension of the spring 8 may be varied, such adjustments being made in accordance with the weight of the machines to which the invention is applied. Whether the springs 8 and $8^a$ be very resilient or be rather stiff, however, all recoil will be absorbed by the recoil springs 12 and $12^a$, the former being disposed as previously described while the latter is interposed between the fork $11^a$ and the lower end of the bracket member $2^a$.

In Fig. 6, the construction of the shock absorber $1^a$ is substantially the same as that shown in Figs. 1 to 3, but in this form of the invention the cap 7' is provided with an integral bracket member 2' from which links 13' rise, the upper ends of said links being pivoted to the front ends of the downwardly and rearwardly inclining links 13'' which are connected to the fork on the vertically movable rod and to the eye on the lower half of the full elliptic spring S' in the same manner as the links 13 are connected to the spring S. The upper half of spring S', however, is turned downwardly and inwardly and is secured to the cap member 7', a recoil spring 12' being interposed between said cap member and the fork to which the links 13'' are pivoted. The manner of operation of this type of the device is identical with the form shown in Figs. 1 to 3 and further description thereof is therefore deemed unnecessary. Furthermore, the construction shown in Fig. 6 may be duplicated at the opposite end of the spring if desired, but since such disposition of the parts amounts to nothing more than duplication, but one end of the spring is illustrated.

From the foregoing description, taken in connection with the accompanying drawings, it will be evident that although very simple construction has been provided for carrying out the object of the invention, any one of the several types in which the shock absorber may be constructed, will be very efficient in operation and will possess advantageous features not attainable by the use of numerous forms of devices now on the market.

Particular emphasis is laid upon the provision of the inclined links, pivoted at their upper ends to a member carried by the chassis, and at their lower ends to a plunger movable vertically against spring means, these features broadly being considered the gist of the present invention.

In the foregoing description I have specifically described certain details of construction for producing probably the best results, and in the drawing such details are illustrated, but it will be evident that I need not be limited thereto otherwise than to the extent to which the appended claims limit me.

Before concluding, it may be well to explain that the location of the load (the weight of the vehicle) between a shock absorbing spring and a recoil spring, is rather an important part of the invention, since these springs act to absorb shocks whether the same be exerted upwardly or downwardly, thus providing a very effective device.

I claim:—

1. A shock absorber comprising an attaching bracket having a pair of laterally extending ears adapted to straddle the side bar of an automobile chassis, clamp means carried by said bracket, a horizontally disposed foot likewise carried thereby, link means pivoted to the bracket below the ears at one end, a rod depending from the other end of said link means through the foot, a stop on said rod below the foot, and a coiled spring interposed between the latter and the stop.

2. A shock absorber comprising a curved substantially upright bracket bar having a pair of laterally extending ears at its upper end adapted for coaction with a clamp, a pair of parallel ears below the aforesaid ears and extending from one side of the bracket bar, an additional pair of parallel ears below the second named pair and extending from the opposite side of the bracket bar, a foot extending laterally from the lower end of said bar, link means pivoted at one end to the aforesaid additional pair of ears, a rod pivoted to the other end of said link means and depending therefrom through the foot, a stop on said rod below the foot, and a shock absorbing spring interposed between the stop and the foot.

In testimony whereof I have hereunto set my hand in presence of two subscribing witnesses.

HERBERT KINTZ.

Witnesses:
　GEO. RITTER,
　J. GEO. ELM.